(12) United States Patent
Lohar et al.

(10) Patent No.: US 11,951,880 B2
(45) Date of Patent: Apr. 9, 2024

(54) VEHICLE SEAT HAVING AN ADJUSTING DEVICE AND VEHICLE HAVING SUCH A VEHICLE SEAT

(71) Applicant: DAIMLER AG, Stuttgart (DE)

(72) Inventors: Dinesh Lohar, Pune (IN); Varad Limaye, Pune (IN); Almar Teubert, Bondorf (DE); Ulrich Lasi, Weil im Schönbuch (DE); Bapusaheb Patil, Pune (IN)

(73) Assignee: MERCEDES-BENZ GROUP AG, Stuttgart (DE)

( * ) Notice: Subject to any disclaimer, the term of this patent is extended or adjusted under 35 U.S.C. 154(b) by 483 days.

(21) Appl. No.: 17/312,068

(22) PCT Filed: Dec. 2, 2019

(86) PCT No.: PCT/EP2019/083285
§ 371 (c)(1),
(2) Date: Jun. 9, 2021

(87) PCT Pub. No.: WO2020/120194
PCT Pub. Date: Jun. 18, 2020

(65) Prior Publication Data
US 2022/0024357 A1 Jan. 27, 2022

(30) Foreign Application Priority Data
Dec. 10, 2018 (DE) .................... 10 2018 009 665.4

(51) Int. Cl.
B60N 2/12 (2006.01)
B60N 2/02 (2006.01)
(Continued)

(52) U.S. Cl.
CPC ........... *B60N 2/12* (2013.01); *B60N 2/02246* (2023.08); *B60N 2/164* (2013.01); *B60N 2/1853* (2013.01); *B60N 2002/022* (2013.01)

(58) Field of Classification Search
CPC .... B60N 2/12; B60N 2/02246; B60N 2/1665; B60N 2/16; B60N 2/164; B60N 2/1853;
(Continued)

(56) References Cited

U.S. PATENT DOCUMENTS 4,846,529 A  7/1989 Tulley
7,543,792 B1  6/2009 Ursel et al.
(Continued)

FOREIGN PATENT DOCUMENTS

DE  19959411 A1  6/2001
DE  202007002243 U1  4/2007
(Continued)

OTHER PUBLICATIONS

International Search Report dated Feb. 28, 2020 in related/corresponding International Application No. PCT/ EP2019/083285.
(Continued)

*Primary Examiner* — Jason S Morrow
(74) *Attorney, Agent, or Firm* — PATENT PORTFOLIO BUILDERS PLLC

(57) ABSTRACT

A vehicle seat has a seat base, a carriage, and an adjusting device. The adjusting device is formed in such a way that the vehicle seat is adjustable vertically or the inclination is adjustable by the adjusting device. The adjusting device has a rotation device arranged on the carriage such that the seat base is rotatable relative to the carriage about a vertical axis by the rotation device. The adjusting device includes a strut, a first end of which is pivotably attached to the carriage or to a rotation base fixed to the carriage and a second end of which is pivotably attached to the seat base. The adjusting
(Continued)

Figure 1:
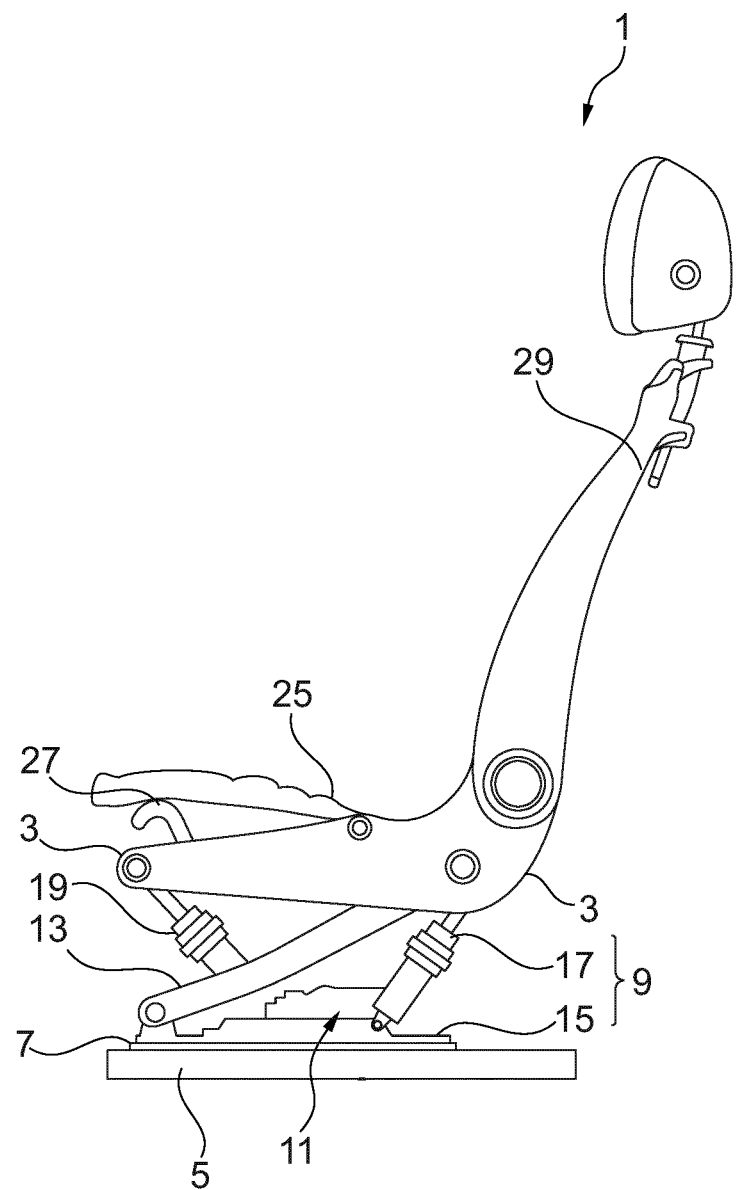

device has first and second linear actuators. The seat base is supported on the first linear actuator, the second linear actuator, and/or the strut. The first and second linear actuators cooperate to adjust the vehicle seat.

10 Claims, 4 Drawing Sheets

(51) Int. Cl.
*B60N 2/16* (2006.01)
*B60N 2/18* (2006.01)

(58) Field of Classification Search
CPC .. B60N 2/1878; B60N 2002/022; B60N 2/14; B60N 2/181
See application file for complete search history.

(56) References Cited

U.S. PATENT DOCUMENTS

| | | | |
|---|---|---|---|
| 8,585,146 B1 | 11/2013 | Giasson et al. | |
| 9,758,078 B2 * | 9/2017 | Haller | B60N 2/505 |
| 10,072,394 B1 * | 9/2018 | Wynkoop | B60N 2/143 |
| 10,850,638 B2 * | 12/2020 | Han | B60N 2/1615 |
| 10,926,669 B2 * | 2/2021 | Aktas | B60N 2/02246 |
| 10,926,676 B2 * | 2/2021 | Dotzler | B60N 2/502 |
| 11,208,010 B2 * | 12/2021 | Haller | B60N 2/14 |
| 11,273,731 B2 * | 3/2022 | Park | B60N 2/163 |
| 11,285,846 B2 * | 3/2022 | Dotzler | B60N 2/508 |
| 11,447,044 B1 * | 9/2022 | Boks | B60N 2/02246 |
| 11,447,254 B2 * | 9/2022 | Carrick | B60N 2/507 |
| 11,548,410 B2 * | 1/2023 | Han | B60N 2/10 |
| 2021/0170921 A1 * | 6/2021 | Seibold | B60N 2/14 |

FOREIGN PATENT DOCUMENTS

| | | |
|---|---|---|
| DE | 102017215910 A1 | 12/2018 |
| EP | 0221544 A2 | 5/1987 |
| WO | 2018234460 A1 | 12/2018 |

OTHER PUBLICATIONS

Office Action created Aug. 21, 2019 in related/corresponding DE Application No. 10 2018 009 665.4.
Written Opinion dated Feb. 28, 2020 in related/corresponding International Application No. PCT/EP2019/083285.

\* cited by examiner

VEHICLE SEAT HAVING AN ADJUSTING DEVICE AND VEHICLE HAVING SUCH A VEHICLE SEAT

BACKGROUND AND SUMMARY OF THE INVENTION

Exemplary embodiments of the invention relate to a vehicle seat having an adjusting device, and to a vehicle having such a vehicle seat having an adjusting device.

Conventional vehicle seats can generally be adjusted vertically and in a longitudinal direction, either separately or in combination. The longitudinal adjustment of vehicle seats, i.e., the adjustment along the vehicle longitudinal axis, is usually effected via a system of rails and carriages. Vehicle seats held rotatably about a vertical axis on a rotation plate are also known.

German utility model specification DE 20 2007 002 243 U1 discloses a height adjusting device of a vehicle seat, which contains two control valves to control the degree of filling of at least one compressed-air actuator, which maintains the seat body at a desired height level and at the same time supports it in a vertically resilient manner, each of which control valves is assigned an actuating member that cooperates with a control slide, such that, when there is a usage-dependent change in the weight supported by the at least one compressed-air actuator, a relative switching movement between the control slide and the respective associated actuating member takes place, causing the switching of the control valves. The relative switching movement is a linear movement, with both control slides being arranged on a control carriage mounted in a linearly displaceable manner in the direction of the switching movement.

U.S. Pat. No. 8,585,146 B1 discloses a seat for a vehicle, wherein the seat has an adjustment mechanism having locking boxes, a suspension system made of a woven mesh, retractable armrests, a movable headrest, and movable leg rests. The headrest additional has lateral wings in order to enlarge the bearing surface.

However, it is disadvantageous that such vehicle seats do not provide any combined adjustment of the height and the inclination with one rotation mechanism, having compact dimensions and being of simple construction.

Exemplary embodiments of the invention are therefore directed to a vehicle seat having an adjusting device, and also a vehicle having such a vehicle seat having an adjusting device, wherein the disadvantages do not arise, and wherein in particular the vehicle seat is designed such that the vehicle seat can be adjusted vertically and/or in terms of inclination by means of the adjusting device, and can be rotated about a vertical axis by means of the rotation device.

According to embodiments, a vehicle seat has a seat base, a carriage that can be arranged on at least one rail on a vehicle floor, and an adjusting device, wherein the seat base is arranged on an upper side of the adjusting device, wherein the carriage is arranged on an underside of the adjusting device, and wherein the adjusting device is formed in such a way that the vehicle seat can be adjusted vertically and/or in terms of inclination by means of the adjusting device. The vehicle seat is characterized in that the adjusting device has a rotation device having at least one drive element, wherein the rotation device is arranged on the carriage, such that the seat base can be rotated relative to the carriage about a vertical axis by means of the rotation device, the adjusting device has at least one strut, wherein a first end of the least one strut is pivotably attached to the carriage or to a rotation base fixed to the carriage, and a second end of the at least one strut is pivotably attached to the seat base, wherein the adjusting device has at least one first linear actuator and at least one second linear actuator, wherein the seat base is supported on the at least one first linear actuator and/or the at least one second linear actuator and/or rests on the at least one strut, wherein the at least one first linear actuator is arranged, in particular attached—preferably in an articulated manner—on one side on the seat base and on the other side on the carriage or on the rotation base fixed to the carriage, wherein the at least one second linear actuator is arranged, in particular attached—preferably in an articulated manner—on one side on the seat base and on the other side on a side of the strut that faces the first end of the at least one strut, wherein the at least one first linear actuator and the at least one second linear actuator cooperate, such that the vehicle seat is adjustable.

According to the invention, therefore, a vehicle seat having an adjusting device is disclosed, which vehicle seat combines vertical adjustment and inclination adjustment by means of at least one strut and at least one first and at least one second linear actuator, and which also enables, in addition to the vertical and inclination adjustment, rotation about a vertical axis of the vehicle seat by means of an integrated rotation mechanism.

The vehicle seat preferably enables particularly easy entry to and exit from the car by a user. The vehicle seat preferably enables a relaxed mode position, in particular for relaxing the user of the vehicle in the seated position.

The vehicle seat having the adjusting device has advantages over the prior art. Advantageously, combined height and inclination adjustment with a rotation about a vertical axis of the vehicle seat is enabled and is of simple construction. Advantageously, the mechanics of the adjusting device are simple, i.e., of less complex construction. Advantageously, control cables and other similar wearing components can be dispensed with, and therefore adjustments are not lost after a long service life. Advantageously, additional components can be dispensed with, giving rise to advantages in terms of cost and assembly. Advantageously, positioning comfort is increased when adjusting the vehicle seat. Advantageously, the installation space required for the vehicle seat and/or the adjusting device is small, i.e., compact, and therefore space-saving. Advantageously, easier entry to and/or exit from the vehicle is made possible. Advantageously, a relaxed position of the vehicle seat is made possible. Advantageously, the vehicle seat having the adjusting device can be incorporated in any type of commercially available vehicle seats. Advantageously, a vehicle seat with particularly good legroom for people on the rear seat of the vehicle is made possible.

The adjusting device is preferably integrated in the vehicle seat.

Preferably, the relaxed position of the vehicle seat can be set by a combination of the first linear actuator, the second linear actuator and the leg rest actuator and the adjustment device of the backrest. Preferably, the entry and exit position can be set by the combination of the first linear actuator, second linear actuator and the adjustment of the backrest.

Preferably, the at least one first linear actuator is arranged, in particular attached—preferably in an articulated manner—on the rear region of the seat base and on a rear region or of the rotation base fixed to the carriage.

Preferably, the at least one second linear actuator is arranged, in particular attached—preferably in an articulated manner—on a front region of the seat base and on a side that faces the first end of the at least one strut.

Preferably, the second linear actuator is arranged on the seat base by means of an element that can be pivoted on both sides, such that the angle between the pivotable element and the second linear actuator and/or the seat base can be changed upon adjustment of the vehicle seat.

Preferably, the vehicle seat has a backrest and/or a headrest, with the backrest preferably being pivotably attached to the seat base and the headrest preferably being arranged on an upper end of the backrest.

Preferably, the backrest is adjustable by an adjustment device for adjusting the inclination of the backrest.

Preferably, the seat base of the vehicle seat, in particular with the backrest arranged on the seat base, can be rotated by at least 5°, preferably at least 10°, preferably at least 15°, preferably at least 20°, preferably at least 25° or preferably at least 30° about the vertical axis of the vehicle seat.

Preferably, the seat base tilts downwards at an angle at the same time as the seat base rotates, and therefore entry to and exit from the vehicle is facilitated.

Preferably, the drive elements, in particular the at least one first linear actuator, the at least one second linear actuator and the at least one drive element of the rotation device are coupled in terms of movement.

Preferably, the at least one first linear actuator and the at least one second linear actuator are movable in the same direction, such that in particular the height of the seat base is adjustable.

Preferably, the at least one first linear actuator and the at least one second linear actuator are movable in opposite directions, such that in particular the inclination of the seat base is adjustable.

Preferably, the adjusting device of the vehicle seat is operated via an operating element. The operating element can be arranged, for example, directly on the vehicle seat in the form of a switch element, which enables safe operation by the user and also an associated gain in comfort. Nevertheless, the operation of the adjusting device is not limited to a switch element; a software solution for adjusting the vehicle seat is also possible, in particular via a smartphone or a vehicle interface. The adjusting device can preferably also be controlled via a control unit, for example a head unit.

A vehicle seat is understood in particular to mean a seat for a vehicle, wherein the vehicle seat can be slid in the longitudinal direction and can be adjusted in terms of height and inclination, and wherein the vehicle seat, in particular the seat base, is at least partially rotatable about a vertical axis of the vehicle seat. The vehicle seat is suitable for a plurality of vehicles, in particular for passenger cars, vans, heavy goods vehicles, buses, mobile homes, construction vehicles, utility vehicles, or even boats, ships and aircraft.

A carriage is understood in particular to mean a displaceable component, preferably a component that can be displaced in or on at least one rail, with the rail being arranged, in particular, on a vehicle floor. The carriage is guided in particular in the at least one rail.

A longitudinal direction is understood, in particular, to mean the longest extension of a vehicle, in which the vehicle is fitted as intended. This is preferably the vehicle longitudinal direction, i.e., the direction in which the vehicle moved forwards or backwards, as intended.

A vertical direction is understood in particular to mean a direction perpendicular to an intended horizontal plane of the vehicle seat, in particular a contact surface for a vehicle having the vehicle seat.

A transverse direction is understood, in particular, to mean the direction perpendicular to the longitudinal direction and perpendicular to the vertical direction of the vehicle.

A linear actuator is understood, in particular, to mean an element designed for adjusting a seat base, in particular for the vertical adjustment and/or inclination adjustment of the seat base, and/or for adjusting a seat shell, in particular for the inclination adjustment of the seat shell.

A drive element is understood, in particular, to mean an element designed for moving the seat base, in particular for rotating the seat base, and/or for displacing a carriage in a rail in the longitudinal direction of the vehicle.

A seat base is understood, in particular, to mean a base construction of a vehicle seat, on the underside of which at least one first linear actuator, at least one second linear actuator, and at least one strut is preferably pivotably attached, and on the upper side of which a seat shell is preferably pivotably attached.

A pivotably attached element is understood, in particular, to mean an element arranged at at least one point on a further element, and can be moved, in particular pivoted, in an intended direction at the at least one point at which it is attached.

A strut is understood, in particular, to mean a connecting element for connecting a carriage to a seat base, with a first end of the strut being pivotably attached to the carriage and the opposite, second end being pivotably attached to the seat base. The strut can be designed as a plate, tube, or rod. Preferably, the first end of the at least one strut is pivotably attached to a front region of the carriage. Preferably, the second end of the at least one strut is pivotably attached to a rear region of the seat base.

Preferably, the at least one first linear actuator and the at least one second linear actuator are synchronously movable, such that the inclination of the seat base is not changed when adjusting the height of the seat base.

Preferably, the vehicle seat is adjusted exclusively via the at least one first linear actuator and the at least one second linear actuator and/or the drive element of the rotation device.

According to a further development of the invention, it is provided that the rotation device has a rotation plate, wherein the rotation plate is arranged rotatably on the carriage or the rotation base, wherein the at least one drive element is arranged on an upper side of the rotation plate and/or between the rotation plate and the carriage or the rotation base, and wherein the rotation plate is connected to the seat base such that the rotation plate is rotatable together with the seat base about a vertical axis relative to the carriage and/or the rotation base. As a result, this enables particularly simple assembly of the rotation device.

In a particularly preferred embodiment, the carriage is designed to be in one piece with the rotation base.

According to a further development of the invention, it is provided that the at least one first linear actuator and the at least one second linear actuator can be controlled separately from one another, such that the first linear actuator and the second linear actuator are separately adjustable. This enables in particular an adjustment of the inclination of the seat base which is separate from the vertical adjustment.

According to a further development of the invention, the adjusting device has two first linear actuators and/or two second linear actuators, wherein the two first linear actuators and/or the two second linear actuators are each arranged opposite one another in the transverse direction of the vehicle, and wherein, preferably, the two first linear actuators and/or the two second linear actuators are connected to one another via at least one cross-member. This ensures in particular that the adjusting device is particularly stable. Furthermore, the permitted weight load is increased.

According to a further development of the invention, the adjusting device has at least two struts, wherein the at least two struts are arranged opposite one another in the transverse direction of the vehicle, and wherein, preferably, the at least two struts are connected to one another via at least one cross-member. The cross-member serves, in particular, for stabilizing the struts. This ensures, in particular, that the vehicle seat is particularly stable, with the vehicle seat in particular swaying less when travelling.

A cross-member is understood in particular to mean a connecting element of two struts and/or two linear actuators, wherein a first end of the cross-member is preferably arranged on, in particular fastened to, a strut or a linear actuator and the opposite second end thereof is arranged on, in particular fastened to, a second strut or a second linear actuator. Preferably, the cross-member is arranged on a first end of the two struts or on a first end of the two linear actuators, with the first ends of the struts and/or the first ends of the linear actuators facing the carriage and/or the rotation base. The cross-member is, in particular, designed as a plate, tube, or rod.

According to a further development of the invention, the at least one first linear actuator and/or the at least one second linear actuator are designed as an electric motor, mechanical drive, pneumatic cylinder, or hydraulic cylinder.

According to a further development of the invention, the vehicle seat has a seat shell, wherein the seat shell is arranged on the seat base, wherein a rear side of the seat shell is pivotably attached to the rear region of the seat base, and a front side of the seat shell is connected via at least one third linear actuator to the front region of the seat base such that the inclination of the seat shell relative to the seat base is adjustable. This, in particular, makes it possible for the inclination of the seat shell to be adjustable separately to the seat base. Preferably, one end of the at least one third linear actuator is pivotably attached to the seat base and the opposite other end thereof is pivotably attached to the seat shell, in particular the underside of the seat shell. Preferably, the inclination of the seat shell is adjusted thereby; in particular, the front end of the seat shell is inclined such that easier entry and exit is enabled.

Preferably, the vehicle seat is designed such that an inclined position of the seat shell arising from an inclination adjustment of the seat base can be compensated for by a corresponding inclination adjustment of the seat shell.

A front side and/or a front region is understood, in particular, to mean a side or region facing the intended front region of the vehicle as seen in the longitudinal direction of the vehicle, and correspondingly, a rear side and/or a rear region is understood in particular to mean a side or region facing the intended rear region of the vehicle as seen in the longitudinal direction of the vehicle.

According to a development of the invention, the vehicle seat has at least one indentation at the end of the vehicle seat, which indentation extends in the longitudinal direction of the vehicle seat in a certain section extending in the transverse direction of the vehicle seat between the seat base and the carriage on both sides. Preferably, the section extends over the entire space between the seat base and the carriage as seen in a vertical axis of the vehicle. This makes it possible, in particular, to achieve a free space, in particular in the lower region of the vehicle seat, such that, for example, a person sitting on a rear seat of the vehicle has more legroom, in particular on the right and left of the vehicle seat as seen in the longitudinal direction of the vehicle.

An indentation is understood to mean a recess which can be designed in a different shape.

According to a development of the invention, the vehicle seat has a leg rest, with the leg rest being arranged pivotably on the seat base and/or on the seat shell.

Preferably, one end of the leg rest is operatively connected to the seat base and/or the seat shell via a leg rest actuator, such that the inclination of the leg rest can be changed, with the one end of the leg rest preferably being pivotably arranged on the seat base and/or the seat shell via an element and an opposite end thereof being pivotably arranged with the leg rest actuator such that, upon actuation of the leg rest actuator, the inclination of the leg rest can be adjusted.

Preferably, the leg rest is adjustable independently of the height and/or inclination of the vehicle seat.

Preferably, the vehicle seat has an adjusting device integrated into the vehicle seat for adjusting the height and/or inclination of the vehicle seat, for rotating the vehicle seat, in particular the seat base, relative to the carriage about a vertical axis of the vehicle seat, and a leg rest, such that a relaxed mode position of the vehicle seat, and a position of the vehicle seat for easy entry to and exit from the vehicle, are enabled.

Exemplary embodiments are also directed to a vehicle having at least one vehicle seat according to the invention. In particular, the advantages that have already been explained in connection with the vehicle seat arise in connection with the vehicle. The vehicle has at least one rail on a vehicle floor, wherein the carriage of the vehicle seat is designed to be linearly displaced on the at least one rail for the forwards and backwards adjustment of the vehicle seat. Preferably, the at least one rail is designed such that the carriage can engage in the rail.

Preferably, the carriage has a cross-section adapted to the at least one rail, locally in a receiving region.

Preferably, the carriage and/or the rail has at least one drive element. Preferably, the at least one drive element is arranged in or on the carriage and/or the at least one rail such that the vehicle seat is adjustable in a longitudinal direction, in particular can be moved backwards and forwards in the longitudinal direction of the vehicle.

According to a development of the invention, it is provided that the carriage preferably engages in two rails arranged on the vehicle floor, wherein the two rails are arranged parallel on the vehicle floor, and wherein the two rails are spaced apart in the transverse direction of the vehicle. This ensures in particular that the vehicle seat can be arranged stably on the vehicle floor.

The invention is explained in more detail using the drawing.

BRIEF DESCRIPTION OF THE DRAWING FIGURES

Figure 2:
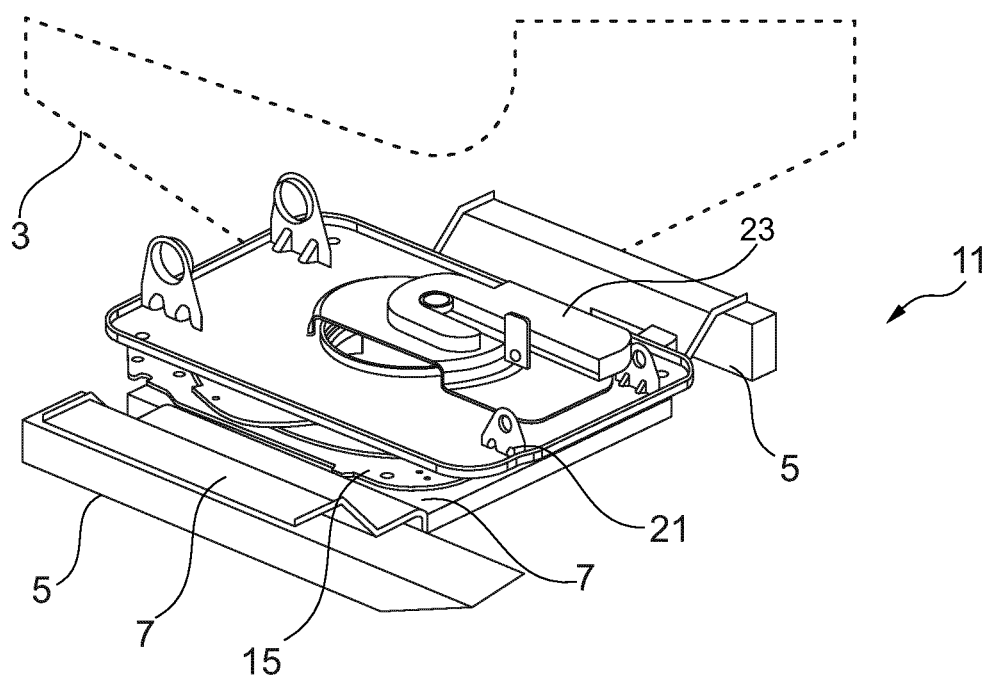
Figure 3:
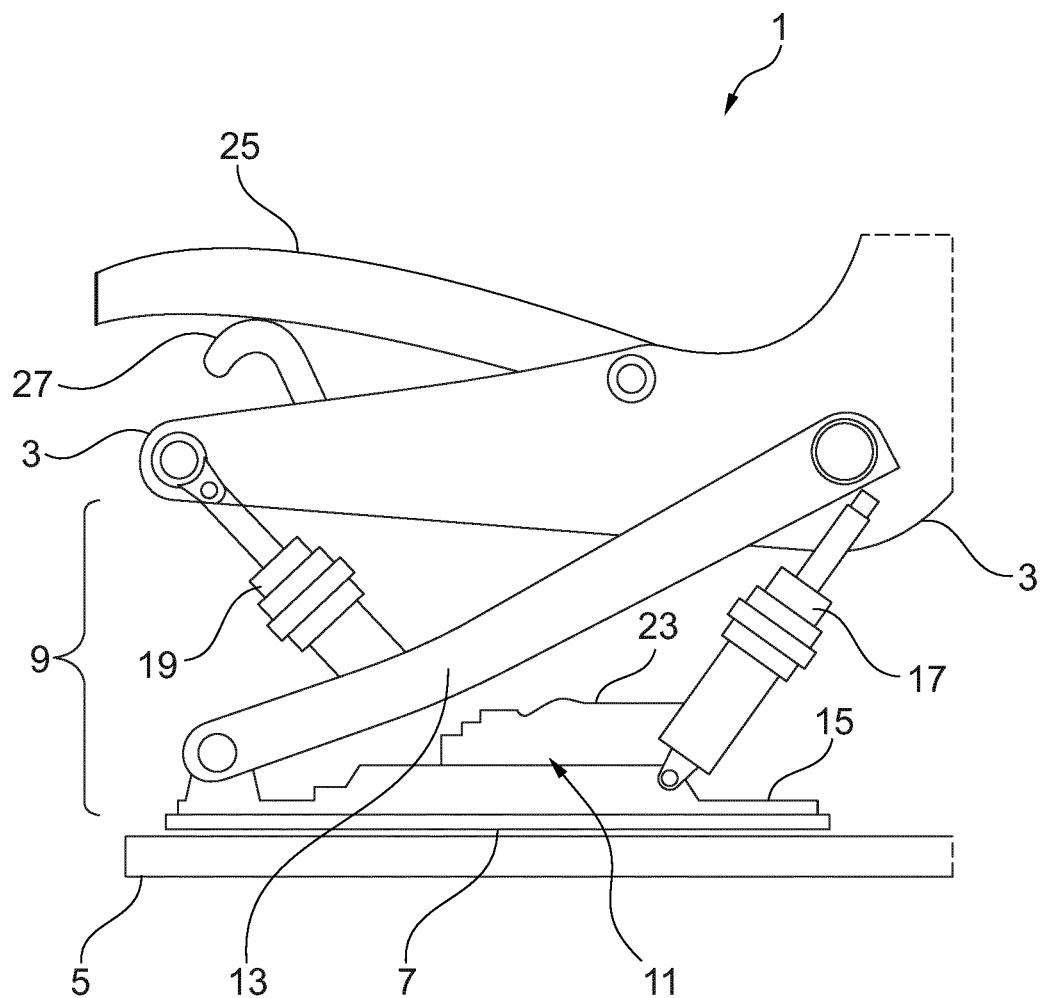
Figure 4:
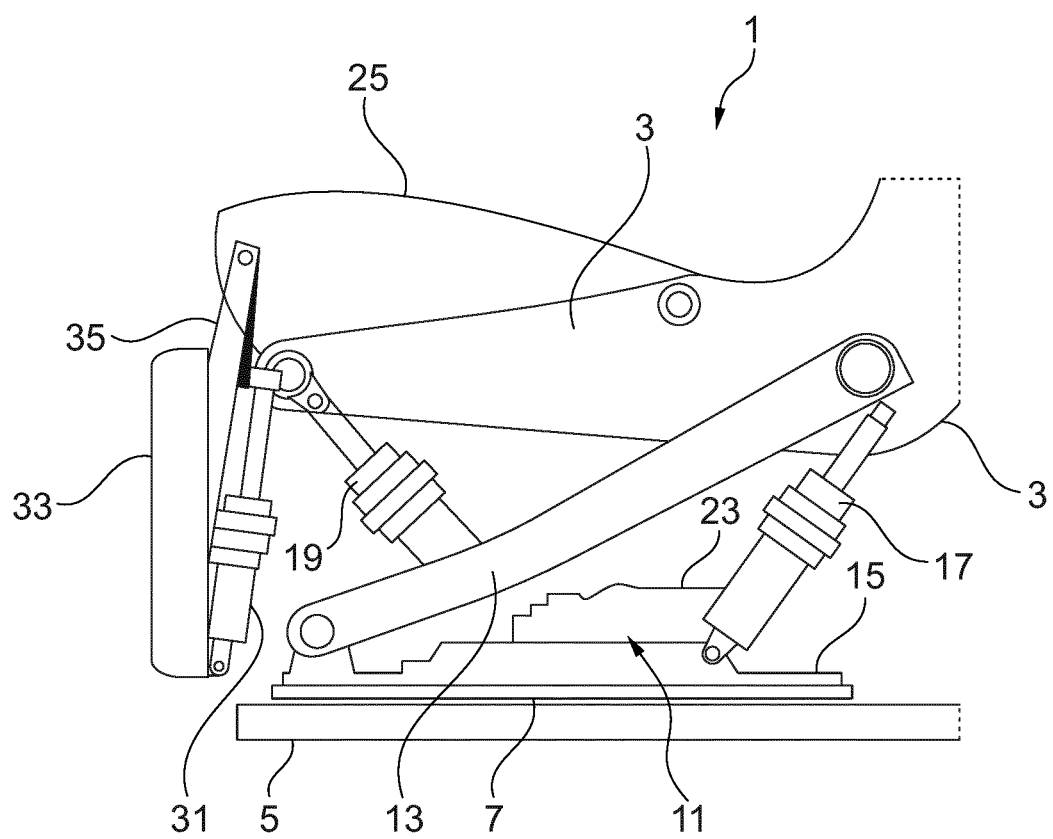

The figures show:

FIG. 1 a schematic depiction of a vehicle seat having an adjusting device in a functional position in a side view in one exemplary embodiment;

FIG. 2 a schematic depiction of a rotation device of the vehicle seat in a side view in one exemplary embodiment;

FIG. 3 a schematic depiction of the adjusting device of the vehicle seat in a side view in one exemplary embodiment; and FIG. 4 a schematic depiction of the vehicle seat having a leg rest in a side view in one exemplary embodiment.

DETAILED DESCRIPTION

FIG. 1 shows a schematic depiction of a vehicle seat 1 having an adjusting device 9 in a functional position in a side view in one exemplary embodiment. The vehicle is not depicted.

The vehicle seat 1 has a seat base 3, a carriage 7 (which can be arranged on at least one rail 5 on a vehicle floor), and the adjusting device 9. The seat base 3 is arranged on an upper side of the adjusting device 9, and the carriage 7 is arranged on an underside of the adjusting device 9. The adjusting device 9 is formed in such a way that the vehicle seat 1 can be adjusted vertically and/or the inclination can be adjusted by means of the adjusting device 9. The adjusting device 9 has a rotation device 11 having at least one drive element 23, wherein the rotation device 11 is arranged on the carriage 7, such that the seat base 3 can be rotated relative to the carriage 7 about a vertical axis by means of the rotation device 11. The adjusting device 9 has at least one strut 13, wherein a first end of the least one strut 13 is pivotably attached to the carriage 7 or to a rotation base 15 fixed to the carriage 7, and a second end of the at least one strut 13 is pivotably attached to the seat base 3. The adjusting device 9 has at least one first linear actuator 17 and at least one second linear actuator 19. The seat base 3 is supported on the at least one first linear actuator 17 and/or the at least one second linear actuator 19 and/or rests on the at least one strut 13. The at least one first linear actuator 17 is arranged on one side on the seat base 3 and on the other side on the carriage 7 or on the rotation base 15 fixed to the carriage 7. The at least one second linear actuator 19 is arranged on one side on the seat base 3 and on the other side on a side of the strut 13 that faces the first end of the at least one strut 13. The at least one first linear actuator 17 and the at least one second linear actuator 19 cooperate, such that the vehicle seat 1 is adjustable.

Advantageously, combined height and inclination adjustment with a rotation about a vertical axis of the vehicle seat is enabled. Advantageously, positioning comfort is increased when adjusting the vehicle seat. Advantageously, the installation space required for the vehicle seat and/or the adjusting device is small. Advantageously, the mechanics of the adjusting device are simple, i.e., of less complex construction. Advantageously, additional components can be dispensed with, giving rise to advantages in terms of cost and assembly.

In one configuration of the vehicle seat 1, the rotation device 11 has a rotation plate 21, wherein the rotation plate 21 is arranged rotatably on the carriage 7 or the rotation base 15. The at least one drive element 23 is arranged on an upper side of the rotation plate 21 and/or between the rotation plate 21 and the carriage 7 or the rotation base 15. The rotation plate 21 is connected to the seat base 3 such that the rotation plate 21 is rotatable together with the seat base 3 about a vertical axis relative to the carriage 7 and/or the rotation base 15.

In a further configuration of the vehicle seat 1, the at least one first linear actuator 17 and the at least one second linear actuator 19 can be controlled separately from one another, such that the first linear actuator 17 and the second linear actuator 19 are separately adjustable.

In a further configuration of the vehicle seat 1, the adjusting device 9 has two first linear actuators 17 and/or two second linear actuators 19, wherein the two first linear actuators 17 and/or the two second linear actuators 19 are each arranged opposite one another in the transverse direction of the vehicle. Preferably, the two first linear actuators 17 and/or the two second linear actuators 19 are connected to one another via at least one cross-member.

In a further configuration of the vehicle seat 1, the adjusting device 9 has at least two struts 13, wherein the at least two struts 13 are arranged opposite one another in the transverse direction of the vehicle. Preferably, the at least two struts 13 are connected to one another via at least one cross-member.

In a further configuration of the vehicle seat 1, the at least one first linear actuator 17 and/or the at least one second linear actuator 19 are designed as an electric motor, mechanical drive, pneumatic cylinder, or hydraulic cylinder.

In a further configuration of the vehicle seat 1, the vehicle seat 1 has a seat shell 25, wherein the seat shell 25 is arranged on the seat base 3, wherein a rear side of the seat shell 25 is pivotably attached to the rear region of the seat base 3, and a front side of the seat shell 25 is connected via at least one third linear actuator 27 to the front region of the seat base 3 such that the inclination of the seat shell 25 relative to the seat base 3 is adjustable.

In a further embodiment of the vehicle seat 1, the vehicle seat 1 has at least one indentation at the end of the vehicle seat 1, which indentation extends in the longitudinal direction of the vehicle seat 1 in a certain section extending in the transverse direction of the vehicle seat 1 between the seat base 3 and the carriage 7 on both sides.

In a further configuration of the vehicle seat 1, the vehicle seat 1 has a backrest 29, wherein the backrest 29 is arranged on the seat base 3, in particular on a rear region of the seat base. The backrest 29 is preferably pivotably attached to the seat base 3.

The vehicle seat 1 is in particular a vehicle seat 1 for a vehicle. The vehicle with the at least one vehicle seat 1 has at least one rail 5 on a vehicle floor. The carriage 7 of the vehicle seat is designed to be linearly displaced on the at least one rail 5 for the forwards and backwards adjustment of the vehicle seat 1.

In one embodiment of the vehicle, the carriage 7 preferably engages in two rails 5 arranged on the vehicle floor. The two rails 5 are arranged in parallel on the vehicle floor and are spaced apart in the transverse direction of the vehicle.

FIG. 2 shows a schematic depiction of a rotation device 11 of the vehicle seat 1 in a side view in one exemplary embodiment. Similar and functionally similar elements have been provided with the same reference numerals, such that reference can be made to the previous description where appropriate. The vehicle is not depicted.

FIG. 3 shows a schematic depiction of the adjusting device 9 of the vehicle seat 1 in a functional position in a side view in one exemplary embodiment. Similar and functionally similar elements have been provided with the same reference numerals, such that reference can be made to the previous description where appropriate. The vehicle is not depicted.

FIG. 4 shows a schematic depiction of the vehicle seat 1 having a leg rest 33 in a side view in one exemplary embodiment. Similar and functionally similar elements have been provided with the same reference numerals, such that reference can be made to the previous description where appropriate. The vehicle is not depicted.

The vehicle seat 1 has the leg rest 33. One end of the leg rest 33 is arranged pivotably on the seat base 3 and/or on the seat shell 25. Preferably, one end of the leg rest 33 can be operatively connected, in particular via an element 35, to the seat base 3 and/or the seat shell 25 via a leg rest actuator 31, such that the inclination of the leg rest 33 can be changed, with the leg rest 33 being pivotably arranged in particular on the seat base 3 and/or the seat shell 25 and an opposite end thereof being pivotably arranged with the leg rest actuator 31 such that, upon actuation of the leg rest actuator 31, the inclination of the leg rest 33 can be adjusted.

The leg rest 33 is adjustable independently of the height and/or inclination of the vehicle seat 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A vehicle seat, comprising:
   a seat base;
   a carriage configured to be arranged on at least one rail on a vehicle floor;
   an adjusting device,
   wherein the seat base is arranged on an upper side of the adjusting device and the carriage is arranged on an underside of the adjusting device,
   wherein the adjusting device is formed in such a way that the vehicle seat is adjustable vertically or an inclination of the vehicle seat is adjustable by the adjusting device,
   wherein the adjusting device comprises a rotation device having at least one drive element and a rotation base rotatably fixed to the carriage,
   wherein the rotation device is arranged on the carriage such that the seat base is rotatable relative to the carriage about a vertical axis by the rotation device,
   wherein the adjusting device has at least one strut, wherein a first end of the least one strut is pivotably attached to the rotation base and a second end of the at least one strut is pivotably attached to the seat base,
   wherein the adjusting device has at least one first linear actuator and at least one second linear actuator,
   wherein the seat base is supported on the at least one first linear actuator or the at least one second linear actuator or the seat base rests on the at least one strut,
   wherein one side of the at least one first linear actuator is arranged on the seat base and another side of the at least one first linear actuator is arranged on the carriage or on the rotation base fixed to the carriage,
   wherein one side of the at least one second linear actuator is arranged on the seat base and another side of the at least one second linear actuator is arranged on a side of the at least one strut, and
   wherein the at least one first and second linear actuators cooperate to adjust the vehicle seat.

2. The vehicle seat of claim 1, wherein
   the rotation device has a rotation plate arranged rotatably on the carriage or the rotation base,
   the at least one drive element is arranged on an upper side of the rotation plate, between the rotation plate and the carriage, or between the rotation plate and the rotation base, and
   the rotation plate is connected to the seat base such that the rotation plate is rotatable together with the seat base about a vertical axis relative to the carriage or the rotation base.

3. The vehicle seat of claim 1, wherein the at least one first linear actuator and the at least one second linear actuator are configured to be separately controllable such that the first linear actuator and the second linear actuator are separately adjustable.

4. The vehicle seat of claim 1, wherein
   the adjusting device has two first linear actuators or two second linear actuators,
   the two first linear actuators or the two second linear actuators are each arranged opposite one another in a transverse direction of a vehicle, and
   the two first linear actuators or the two second linear actuators are connected to one another via at least one cross-member.

5. The vehicle seat of claim 1, wherein the at least one structure comprises at least two struts arranged opposite one another in a transverse direction of a vehicle, and wherein the at least two struts are connected to one another via at least one cross-member.

6. The vehicle seat of claim 1, wherein the at least one first linear actuator or the at least one second linear actuator are an electric motor, mechanical drive, pneumatic cylinder, or hydraulic cylinder.

7. The vehicle seat of claim 1, further comprising:
   a seat shell arranged on the seat base, wherein a rear side of the seat shell is pivotably attached to a rear region of the seat base, and a front side of the seat shell is connected via at least one third linear actuator to a front region of the seat base such that an inclination of the seat shell relative to the seat base is adjustable.

8. The vehicle seat of claim 1, further comprising:
   at least one indentation at an end of the vehicle seat, wherein the at least one indentation extends in a longitudinal direction of the vehicle seat in a certain section extending in a transverse direction of the vehicle seat between the seat base and the carriage on both sides.

9. A vehicle, comprising:
   a vehicle floor;
   at least one rail arranged on the vehicle floor; and
   a vehicle seat, comprising
      a seat base;
      a carriage configured to be arranged on at least one rail on a vehicle floor;
      an adjusting device,
      wherein the seat base is arranged on an upper side of the adjusting device and the carriage is arranged on an underside of the adjusting device,
      wherein the adjusting device is formed in such a way that the vehicle seat is adjustable vertically or an inclination of the vehicle seat is adjustable by the adjusting device,
      wherein the adjusting device comprises a rotation device having at least one drive element and a rotation base rotatably fixed to the carriage,
      wherein the rotation device is arranged on the carriage such that the seat base is rotatable relative to the carriage about a vertical axis by the rotation device, wherein the adjusting device has at least one strut, wherein a first end of the least one strut is pivotably attached to the rotation base and a second end of the at least one strut is pivotably attached to the seat base, wherein the adjusting device has at least one first linear actuator and at least one second linear actuator, wherein the seat base is supported on the at least one first linear actuator or the at least one second linear actuator or the seat base rests on the at least one strut, wherein one side of the at least one first linear actuator is arranged on the seat base and another side of the at least one first linear actuator is arranged on the carriage or on the rotation base fixed to the carriage, wherein one side of the at least one second linear actuator is arranged on the seat base and another side of the at least one second linear actuator is arranged on a side of the at least one strut, wherein the at least one first and second linear actuators cooperate to adjust the vehicle seat, wherein the carriage of the vehicle seat is affixed to the at least one rail so that the vehicle seat is linearly slidable on the at least one rail for forwards and backwards adjustment of the vehicle seat.

10. The vehicle of claim 9, wherein the at least one rail comprises two rails, and wherein the carriage engages in the two rails, which are arranged parallel on the vehicle floor, and wherein the two rails are spaced apart in a transverse direction of the vehicle.

\* \* \* \* \*